United States Patent
Soncodi et al.

(10) Patent No.: US 10,482,084 B2
(45) Date of Patent: Nov. 19, 2019

(54) OPTIMIZED MERGE-SORTING OF DATA RETRIEVED FROM PARALLEL STORAGE UNITS

(71) Applicant: NetScout Systems Texas, LLC, Westford, MA (US)

(72) Inventors: Adrian C. Soncodi, Plano, TX (US); Balaji Ram, Allen, TX (US); Scott Sanders, Plano, TX (US)

(73) Assignee: NetScout Systems Texas, LLC, Plano, TX (US)

( * ) Notice: Subject to any disclaimer, the term of this patent is extended or adjusted under 35 U.S.C. 154(b) by 637 days.

(21) Appl. No.: 15/238,392

(22) Filed: Aug. 16, 2016

(65) Prior Publication Data
US 2018/0052887 A1   Feb. 22, 2018

(51) Int. Cl.
*G06F 16/2453*   (2019.01)
*G06F 16/2458*   (2019.01)
(Continued)

(52) U.S. Cl.
CPC ...... *G06F 16/24532* (2019.01); *G06F 9/5005* (2013.01); *G06F 16/2272* (2019.01);
(Continued)

(58) Field of Classification Search
CPC ............. G06F 16/489; G06F 16/24568; G06F 16/2246; G06F 16/2272; G06F 16/2477; G06F 9/5005; H04N 21/8456
See application file for complete search history.

(56) References Cited

U.S. PATENT DOCUMENTS

| 7,010,538 | B1 * | 3/2006 | Black | H04L 67/02 707/636 |
| 2003/0088542 | A1 * | 5/2003 | McGee | G06F 11/323 |

(Continued)

FOREIGN PATENT DOCUMENTS

| EP | 2482209 A1 | 8/2012 |
| EP | 3002924 A1 | 4/2016 |

OTHER PUBLICATIONS

Extended European Search Report for European Patent Appliction No. 17186502.5, dated Nov. 30, 2017.
(Continued)

*Primary Examiner* — Amanda L Willis
(74) *Attorney, Agent, or Firm* — Locke Lord LLP; Scott D. Wofsy; Christopher J. Capelli (57) ABSTRACT

A data storage system includes storage nodes adapted to provide retrieval of time-based data in response to a receipt of a time-based data retrieval request associated with data streams. Each of the data streams includes time-ordered data items having a header. The header includes timestamps representing a time interval associated with the data items. The data storage system further includes applications issuing the time-based data retrieval requests associated with the data streams and session managers coupled to the applications and storage nodes. Shared resources are dynamically allocated between the applications submitting the requests. Data requested by the requests is retrieved from the storage nodes using timestamp based indexes associated with the data streams in a substantially parallel manner. The retrieved data is merge-sorted by time. The sorted data is transmitted to the applications based on a delivery rate controlled by each application.

17 Claims, 4 Drawing Sheets

(51) Int. Cl.
*G06F 16/22* (2019.01)
*G06F 16/2455* (2019.01)
*G06F 9/50* (2006.01)
*H04N 21/234* (2011.01)
*H04N 21/845* (2011.01)

(52) U.S. Cl.
CPC .... *G06F 16/2477* (2019.01); *G06F 16/24568* (2019.01); *H04N 21/23406* (2013.01); *H04N 21/8456* (2013.01)

(56) References Cited

U.S. PATENT DOCUMENTS

| | | | |
|---|---|---|---|
| 2006/0056436 A1* | 3/2006 | Horikawa | H04L 12/66 370/412 |
| 2007/0255846 A1 | 11/2007 | Wee et al. | |
| 2014/0236889 A1* | 8/2014 | Vasan | H04L 67/1097 707/610 |
| 2018/0052858 A1* | 2/2018 | Soncodi | G06F 16/13 |

OTHER PUBLICATIONS

Huang, Te-Yuan, et al: "Confused, timid, and unstable", Proceedings of the 2012 ACM Conference on Internet Measurement Conference, IMC '12, Jan. 1, 2012 (Jan. 1, 2012), p. 225, XP055133547, New York, NY, USA; DOI: 10.1145/2398776.2398800; ISBN: 978-1-45-031705-4.

Office Action from the European Patent Office for European Patent Application No. EP17186502.5, dated Apr. 25, 2019.

Gemmell, D.J. et al: "Multimedia Storage Servers: A Tutorial", Computer, IEEE Computer Society, USA, vol. 28, No. 5, May 1, 1995 (May 1, 1995), pp. 40-49, XP000517832, ISSN: 0018-9162, DOI: 10.1109/2.384117.

* cited by examiner

OPTIMIZED MERGE-SORTING OF DATA RETRIEVED FROM PARALLEL STORAGE UNITS

FIELD OF THE INVENTION

Embodiments of the present invention relate to network storage, and particularly to optimized merge-sorting of data retrieved from parallel storage units.

BACKGROUND OF THE INVENTION

Time series data are sequences of time stamped records occurring in one or more usually continuous streams, representing some type of activity made up of discrete events. Examples include information processing logs, market transactions, audio, video and sensor data from real-time monitors (supply chains, military operation networks, or security systems). The ability to index, search, and present relevant retrieval results is important to understanding and working with systems emitting large quantities of time series data.

Searching time series data typically involves the ability to restrict search results efficiently to specified time windows and other time-based metadata such as frequency, distribution of inter-arrival time, and total number of occurrences or class of result. For such real-time streaming/monitoring applications (client applications) data retrieval by timestamps is a common use case. However, time series data searches can return a massive amount of data items. In order to display the data in a meaningful manner, when presenting the retrieved time series data to a user, client applications typically need the data to be sorted by time. However, indexing and sorting time series data is further complicated because the data can be collected from multiple, different sources asynchronously and out of order. Streams of data from one source may be seconds old and data from another source may be interleaved with other sources or may be days, weeks, or months older than other sources. Moreover, data source times may not be in sync with each other, requiring adjustments in timestamps post indexing. Thus, most client applications typically need time-series data to be merged and sorted by time but they lack sufficient resources to perform such complex sorting even with optimized algorithms.

It is desired to have methods and procedures to perform optimized merge-sorting of time-ordered data within the storage layer itself.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a data storage system in a high-capacity network is provided. The data storage system includes a plurality of storage nodes adapted to provide storage and retrieval of time-based data of one or more data streams in response to a receipt of a time-based data retrieval request associated with the data streams. Each of the data streams includes a plurality of time-ordered data items having a header. The header includes two or more timestamps representing a time interval associated with each of the plurality of time-ordered data items. The data storage system further includes a plurality of applications providing a user interface to issue the time-based data retrieval request associated with the data streams. The data storage system also includes one or more session managers communicatively coupled to the plurality of applications and to the plurality of storage nodes. The session managers are adapted to dynamically allocate shared resources between at least some of the plurality of applications submitting substantially simultaneous time-based data retrieval requests. The session managers are further adapted to retrieve data requested by the simultaneous time-based data retrieval requests from one or more of the plurality of storage nodes using timestamp based indexes associated with the one or more data streams in a substantially parallel manner. The session managers are also adapted to merge-sort the retrieved data by time using the timestamp based indexes associated with the data streams. The session managers are further adapted to transmit the sorted data to the plurality of applications based on a delivery rate controlled by each application associated with each time-based data retrieval request.

In another aspect, a computer program product for storing and retrieving stream based data in a high-capacity network having a plurality of storage nodes is provided. The computer program product comprises one or more computer-readable storage devices and a plurality of program instructions stored on at least one of the one or more computer-readable storage devices. The plurality of program instructions includes program instructions to dynamically allocate shared resources between at least some of a plurality of applications submitting simultaneous time-based data retrieval requests. The plurality of program instructions further includes program instructions to retrieve data of one or more data streams requested by the simultaneous time-based data retrieval requests from one or more of the plurality of storage nodes using timestamp based indexes associated with the one or more data streams in a substantially parallel manner. The plurality of program instructions also includes program instructions to merge-sort, in parallel manner, the retrieved data by time using the timestamp based indexes associated with the one or more data streams. The plurality of program instructions further include program instructions to transmit the sorted data to the plurality of applications based on a delivery rate controlled by each application associated with each time-based data retrieval request.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

Described embodiments of the present invention concern a comprehensive distributed data management platform that includes a variety of mission critical applications, large number of application servers running different operating systems, processing nodes, storage units with differing capabilities, and many session managers that interconnect application servers with storage units. Transparently scalable storage management platform described herein deals with many storage aspects, such as, for example, but not limited to, storage network topology, efficient data retrieval, and capacity planning.

Various embodiments are disclosed herein that enable support of a highly flexible and highly scalable storage system consisting of variable and possibly limited storage resources. This storage system may implement a Quality of Storage ("QoSt") data policy that consists of a priority and retention period. A high-throughput QoSt-enabled network avoids the shortcomings of the known storage solutions by taking into the account all the available resources and all the data access requests combined, at any time and by obtaining an optimal performance and optimal data retention policy within constraints of currently available hardware. A heterogeneous storage system can evolve over time and can include an adequate combination of newly installed and relatively large storage devices and older/smaller storage devices.

Figure 1:
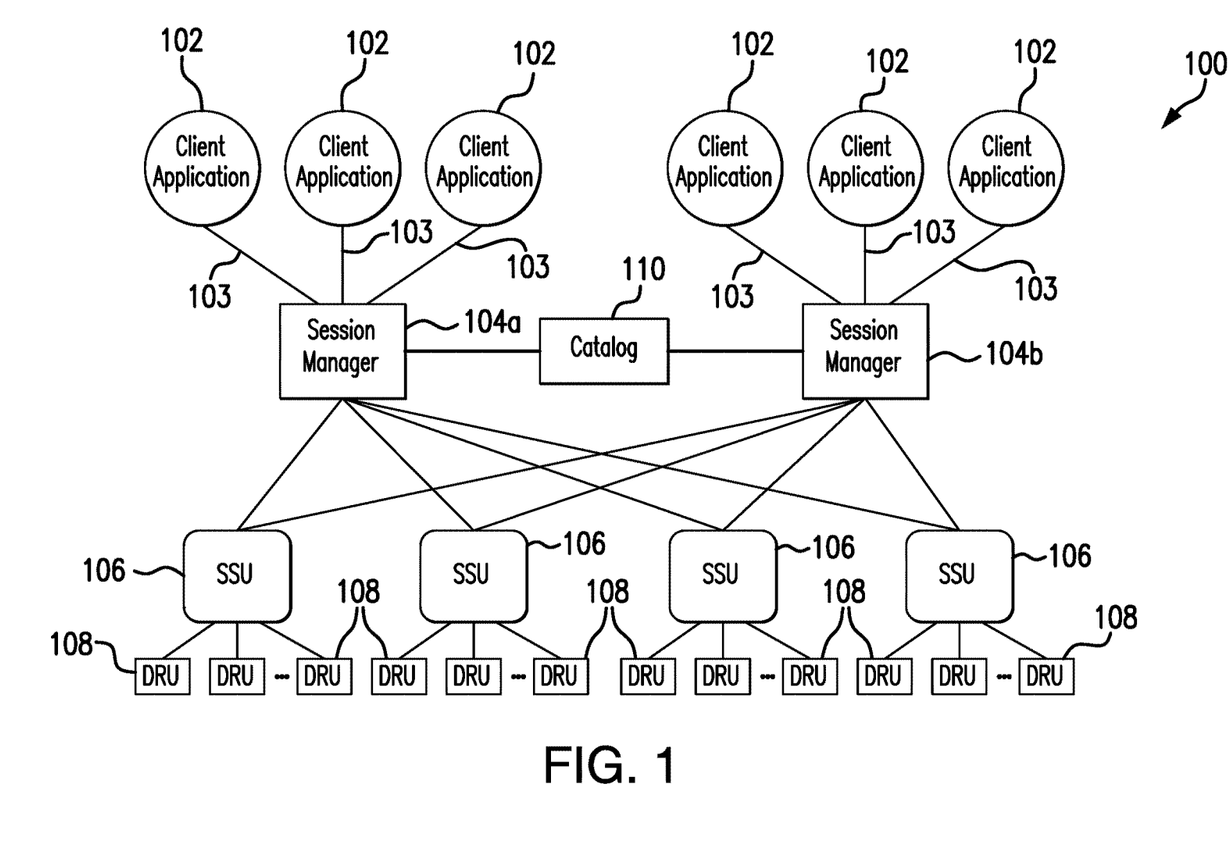
FIG. 1 illustrates a network computing environment in which aspects of the invention are implemented in accordance with certain illustrative embodiments.

Turning to FIG. 1, FIG. 1 is intended to provide a brief, general description of an illustrative and/or suitable exemplary network computing environment in which embodiments of the below described present invention may be implemented. A particular embodiment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

As illustrated in FIG. 1, a plurality of client applications 102 may transmit data (i.e., time-series data) to the storage network 100, which in turn distributes it over storage resources referred to herein as data repository units ("DRUs") 108. Storage nodes ("SSUs") 106 include various modules adapted to store/retrieve data, provided/requested by applications 102 in/from DRUs 108. The applications 102 may reside on a plurality of application servers which may comprise any computational device known in the art (e.g., a workstation, personal computer, mainframe, server, laptop, hand held computer, tablet, telephony device, network appliance, etc.).

Each data repository unit 108 may comprise any storage device, storage system or storage subsystem known in the art that directly connects to the storage network 100 or is attached to one or more storage nodes 106. The DRUs 108 may comprise a Just a Bunch of Disks (JBOD), Redundant Array of Independent Disks (RAID), Network Attached Storage (NAS), a virtualization device, tape library, optical disk library, etc.

The storage network 100 may comprise any high-speed low-latency network system known in the art, such as a Local Area Network (LAN), Storage Area Network (SAN), Intranet, Wide Area Network (WAN), the Internet, etc. LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

The storage nodes 106 may comprise any device capable of managing application access to a storage resource, such as any server class machine, a storage controller, enterprise server, and the like. It is noted that FIG. 1 depicts a simplified two-tiered model of the QoSt-based storage network 100. In various embodiments, the storage nodes 106 may be coupled to client applications 102 via a meshed topology of session managers (referred to herein individually as "session manager 104" and collectively as "session managers 104"). The various below described functions supported by this network tier may be distributed among several session managers 104. According to embodiments of the present invention, the DRUs 108 are viewed by the storage network 100 as the lowest-level entities in this hierarchy. One of the challenges by the QoSt based storage network's framework 100 is that DRUs 108 have highly uneven performance parameters (capacities, throughputs, etc.) that need to be managed.

As shown in FIG. 1, in one embodiment, client application instances 102 may be distributed across a number of network nodes, each instance capable of connecting to any available storage node 106 via functionality provided by distributed session managers 104 with no substantial limitations regarding the amount or type of data it may send/retrieve (except where physical boundary or limitations of bandwidth may apply). In various embodiments, session managers 104 rather than the client application instances 102 are tasked with dynamically allocating computing resources (e.g., program execution capabilities, data storage or management capabilities, network bandwidth, etc.), configuring (e.g., assigning IP addresses, VLANs, etc.) or monitoring bandwidth of each data repository units 108, maintaining separate file systems, and the like. It should be apparent that all of these are managed internally by the session managers 104 transparently to the application instances 102.

According to one embodiment of the present invention, connectivity to the session managers 104 may be defined in terms of generic pipes 103 of raw data items. Data piping between distributed applications 102 and storage network 100 (e.g., a data reader application 102 and a session manager 104) includes the session manager(s) 104 writing retrieved data items to a pipe 103, and the client application 102 reading data items from the pipe 103. The pipe is a conduit of one or more streams of data items. It is noted that each pipe 103 can carry data items from any number of streams and from any number of initiators (i.e., session managers 104*a-b*). For example, any application 102 can connect to the storage network 100 through pipes 103 at any point, without requiring any configuration. In other words, application 102 does not need to know which of the plurality of pipes 103 is connected to which of the plurality of storage nodes 106. Each application 102 may include an API which may support communication between applications 102 and session managers 104. Such API may support data access requests, typically data storage and data retrieval requests, from applications 102. From an application point of view, reading or writing information from/to the storage network 100 may be transparent. For example, since, according to various embodiments of the present invention, applications 102 read or write information from/to data pipes 103, preferably, these applications 102 are not particularly concerned with a type of storage system connected to the other end of the pipe. In fact, from their point of view, the storage network 100 does not necessarily comprise a distributed data storage network but may include any other type of storage solution, for instance a file server or a hard drive.

The plurality of session managers 104 is provided in the disclosed architecture for performing distributed data management operations including adaptive resource allocation and optimized merge-sorting of data, among other functionality. Various embodiments of the present invention contemplate that elastically scalable computing resources are dynamically distributed and redistributed on demand. This adaptive resource allocation may include, but not limited to, prioritized data access, data size estimations with respect to received data retrieval requests and resource allocation based on such estimations. Some embodiments can implement a hierarchical session management structure that is replicated at storage nodes 106 and at higher levels in the hierarchy. In an aspect of the invention, the plurality storage nodes 106 may include a network interface to communicate with the plurality of DRUs 108 where the DRUs 108 hold a set of content data and optionally metadata as opaque data, with each data content item (time based data item) being associated with one or more timestamps.

In addition, according to an embodiment of the present invention, the storage network 100 considers and evaluates all data as global. In other words any data item from any DRUs 108 may be available for any application 102 under any sorting/data aggregation conditions. As the amount of data items stored by the storage network 100 increases and the storage network 100 becomes more complex, the ability to efficiently retrieve data from the storage system is becoming of greater importance in order to provide high performance for applications 102 that need data in real time. In one embodiment of the present invention, the storage network 100 has the ability to utilize timestamp based indexing techniques with respect to stored data items and can provide customized processing of data items based on the time ranges included in the received data access requests. As described below, session managers 104 provide the storage network 100 built-in capabilities to merge segmented data item streams (substreams) collected from various storage resources (i.e. data repository units 108) according to various factors, such as, but not limited to, relevant time ranges, client application priority and the like. Advantageously, the storage network 100 is enabled to adapt dynamically to the current data traffic conditions, thus substantially preventing applications from observing any data storage restrictions.

Resources of storage network 100 may generally be susceptible to being adapted to serve a given demand or need, for example by providing additional processing or storage resources. However, because the demand placed on the storage network 100 can vary with time, it is necessary to manage the resources that are available. In one embodiment, the resources can be managed by the plurality of session managers 104. If the available resources are insufficient for a given demand, performance of the storage network 100 may be compromised. Conversely, if the available storage network 100 resources greatly exceed the demand, the resources may be wasted, resulting in unnecessary costs or lost opportunity in which the resources could have been applied to other needs. Burst activity, in which the demand placed on resources, may increase very rapidly, for example, increasing many multiples or orders of magnitude over the course of minutes or a few hours, can create many challenges to storage network 100 management. It is noted that a fixed amount of memory is available to each storage node 106. Thus, it is desirable to manage memory and other computing resources in an optimal fashion to maximize the number of possible simultaneous requests that can be processed and to optimize the performance of each request. In this manner, the storage nodes 106 are each outfitted with sufficient resources to accomplish their respective data retrieval request workloads, and such is adjusted over time as workloads vary per request.

As noted above, various embodiments of the present invention utilize stream storage architecture and various timestamp based indexing techniques for providing stream-based data services, such as, but not limited to, storing, retrieving, sorting and merging time-based data items in real time. A stream-based data service is a service that involves client applications 102 sending and retrieving a stream of real-time application and data events. Generally, the timestamp based indexes indicate which storage files contain data items that pertain to a particular request submitted by a particular client application. Importantly, each index object includes a plurality of timestamps that indicate specific time ranges corresponding to byte ranges of data stored within the storage files. In one embodiment of the system, each timestamp represents an application generated time specification associated with content of each data item.

Still referring to FIG. 1, in one embodiment, timestamp-based index objects may be stored in a catalog 110. As used herein, the catalog 110 comprises a distributed database containing a variety of real-time metadata information about data streams stored within the storage system 100. For example, the catalog 110 may maintain a complete list of streams (substreams), their QoSt attributes, timespans associated with each stream/substream. In addition to timestamp based indexes, the catalog 110 may further include a plurality of other context-based per-substream indexes, such as, but not limited to IP, IMSI, CPN, etc.

However, persons skilled in the art will appreciate that it would be substantially impossible to provide an infinitely granular time-based index, so the time-based index, generally, can only be an approximation. Furthermore, persons skilled in the art will recognize the extreme unlikelihood of requested time ranges specified in particular data access requests exactly matching timestamps utilized by index objects. Advantageously, various embodiments of the present application disclose time-based indexing techniques that allow returning substantially exact results to client applications that satisfy corresponding data access requests.

Figure 2:
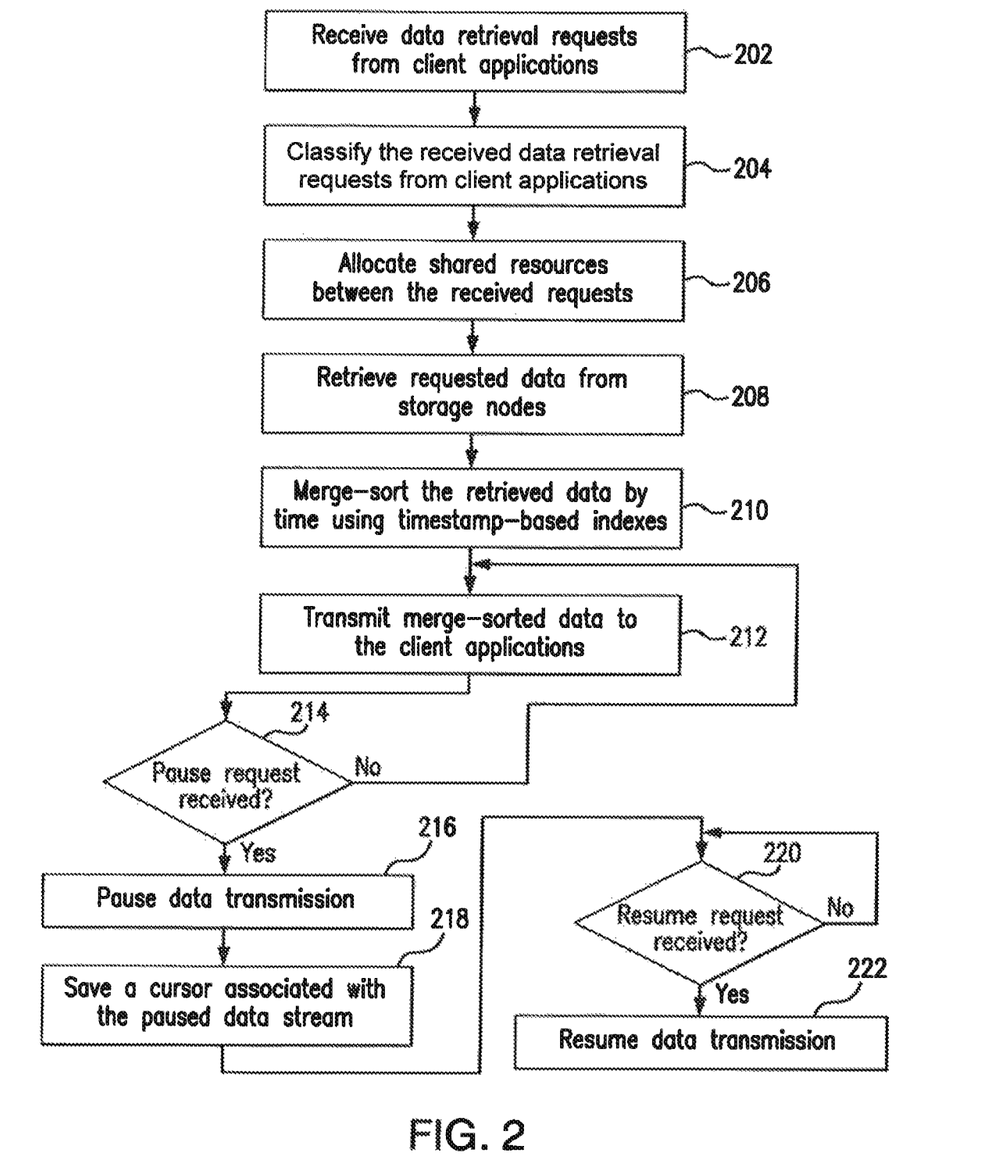
FIG. 2 is a flowchart of operational steps of the session manager module of FIG. 1, in accordance with an illustrative embodiment of the present invention.
Figure 3:
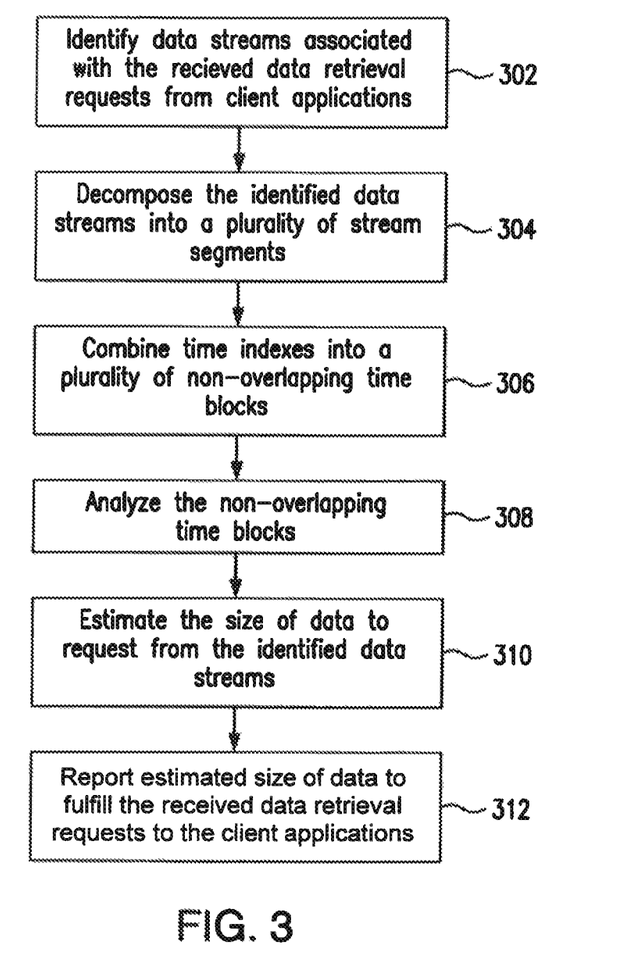
FIG. 3 is a flowchart of operational steps performed by the session manager module of FIG. 1 to provide data retrieval analysis with respect to the received requests, in accordance with an illustrative embodiment of the present invention.

FIGS. 2 and 3 are flowcharts of operational steps of the session manager module 104 of FIG. 1, in accordance with exemplary embodiments of the present invention. Before turning to descriptions of FIGS. 2 and 3, it is noted that the flow diagrams shown therein are described, by way of example, with reference to components shown in FIGS. 1 and 4, although these operational steps may be carried out in any system and are not limited to the scenario shown in the aforementioned figures. Additionally, the flow diagrams in FIGS. 2 and 3 show examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

Starting with FIG. 2, FIG. 2 is a high level flowchart of operational steps of the session manager module 104 of FIG. 1. The session manager 104 may generally be a software module or application that coordinates and controls distributed storage operations performed by one or more storage nodes 106. At 202, the session manager 104 preferably receives one or more data retrieval requests from one or more client applications 102. As will be discussed in greater detail below, in some instances, the data stored by the plurality of the data repository units 108 includes a plurality of individual storage blocks, each corresponding to a time range. A data item can then be stored in a block associated with a time range inclusive of the data item's timestamp. This not only optimizes time based searches, but it can allow data items with recent time stamps that may have a higher likelihood of being accessed to be stored at preferable locations that lend to quicker subsequent retrieval. In one embodiment, each data retrieval request includes a certain time criterion (i.e., time range) and, optionally, one or more stream identifiers.

The workload imposed on the shared infrastructure of the storage network 100 is ever-changing, requiring constant changes in allocation of computing resources. The allocation of computing resources among the applications 102 may be changed by the session managers 104 dynamically to match current requirements or demands. These changes could involve adding a resource to those allocated to an application 102, taking away a resource, or modifying a resource. An example would be removing a resource from the application 102. This action would be taken by session manager 104 when it is determined that a resource is unneeded, and could be better utilized by configuring the shared storage infrastructure differently. The resource in question could be made available to service a request of a different application 102. However, not all requests are weighted equally in importance or in the amount of processing required and not all applications 102 have equal priority. For example, from the session manager's 104 perspective, it is more important to service a request that a user is waiting on in real time than a nightly report. Accordingly, at 204, the session manager 104 classifies the received data retrieval requests. In one embodiment, the data retrieval requests can be classified as either background or user-interactive. The session manager 104 may be adapted and operable to delay the processing of background requests until, for example, all user-interactive requests get processed. In other words, if the session manager 104 determines that there is significant pressure on the shared resources, the session manager 104 may control and manage resources so that user-interactive requests can be serviced more quickly, for example, by pausing the processing of the background requests (and releasing resources associated therewith).

Generally, the easiest protocol to share resources would be to predefine a fixed number of maximum data retrieval requests, and divide the available resources evenly. However, such protocol is often less than perfect with respect to optimization because it may waste a significant number of resources and/or underestimate expected demand. For instance, if the actual number of received data retrieval requests is significantly lower than the predefined maximum, the majority of available resources would be wasted. Alternatively, at some point, the computing resources available to be provided to data retrieval requests can run out as computing resources are typically limited. At that point, applications' 102 requests may be denied until further resources become available. In some implementations, such requests are probabilistically denied or granted while some computing resources are still available. By denying some requests or granting only some requests, the efficiency of computing resource usage can be reduced. As will be apparent to those skilled in the art, those wasted resources can be better used by servicing other data retrieval requests and/or assigning unused resources to more demanding client requests. Furthermore, if the predefined maximum number of data retrieval requests is set far too high then almost all resources will be spread too thin among the received requests thusly providing a poor service to many client applications.

Various embodiments of the present invention address the perceived shortcomings of the resource allocation approaches described above and provide a scheme that minimizes the inefficiencies that may occur due to the simultaneous processing of a plurality of data retrieval requests. Referring back to FIG. 2, at 206, the session manager 104 allocates shared resources between the received requests based on the classification performed at step 204. The session manager 204 determines an allocation strategy based on one or more factors related to the received requests. In one embodiment, the session manager 104 utilizes time based index records stored in the catalog 110. Since these index records are time based, they enable quick and relatively easy determination of the size of data retrieval requests associated with specific intervals of time. Further, the session manager 104 may allocate computing resources based on available historical information and based on the desired number of simultaneous client requests to be supported by the session managers 104. Data retrieval from the storage network 100 might include the issuance of a query from the session manager 104 to the storage node 106. According to an embodiment of the present invention, the session manager 104 in cooperation with the storage node 106 is enabled to estimate the size of the query results associated with the received request based at least in part on the requested time interval, number of streams to retrieve from, and the like. Once the information relevant to the received requests (i.e., size of corresponding data) is estimated, the session manager 104 may divide the available resources proportionally so that the session managers 104 and storage nodes 106 can service at least the desired number of simultaneous client requests in parallel (i.e., 1/n, where n represents a predefined minimum number of parallel requests to be supported). Advantageously, the session manager 104 reserves resources associated with the received request upfront. In other words, once the storage node 106 and/or any other component of the storage network 100 starts to process a particular request, the session manager 104 guarantees the required resources for the processing to complete. Another advantage of the disclosed embodiments is that if additional computing resources become available while a particular data retrieval request is being processed, even if the request has the required resources to complete, the session manager 104 may allocate additional resources to the data retrieval request being processed in order to minimize the time to completion.

The desired number of simultaneous client requests to be supported, as well as other global parameters can be configurable on a system-wide basis, and/or on an individual session manager basis. However, as discussed above, the computing resources are not just divided evenly among each received data retrieval request. Since it is highly unlikely that the client applications 102 will be sending the desired number of requests on a permanent basis (or even immediately upon startup), the session manager 104 allocates computing resources more generously while fewer data retrieval requests are submitted by the client applications 102. As discussed above, once new data retrieval requests arrive, the session manager 104 reduces the amount of maximum computing resources that can be utilized by the newly arrived requests. Advantageously, performance of the storage network 100 is optimized with a wide range of usage scenarios. It may seem that allocating less than their fair share of computing resource to requests that arrive later creates an imbalance. However, there are at least two factors that highly likely make the primary effects of such observation rather insignificant. First of all, earlier requests may be completed while the processing of the later ones is underway, thus making available additional resources for the later requests. Second of all, not all data retrieval requests make use of their maximum allocation, so an allocation reduction may not even occur in the first place.

As noted above, at 206, if the computing resources are completely exhausted when one or more applications' 102 requests arrive, the session manager 104 may deny such requests until sufficient resources become available. In some embodiments, the session manager 104 may determine whether the resource shortage is a short term or transitory condition versus a long term condition. Data retrieval requests with short-term or transitory resource conflicts may be eligible for execution after a finite delay. In this case, the session manager 104 notifies corresponding client application 102 of the delay. In one embodiment, data retrieval requests with a long term or indeterminate resource shortage may be placed into a sleep state by the session manager 104. The session manager 104 may wake up sleeping data retrieval requests on the occurrence of certain conditions. Such conditions may include, but are not limited to: the resource is available for allocation or the needed resource is no longer in use. Generally, computing resources are retained by one or more components of the storage network 100 until they are no longer in use for the request in progress. For example, if the data from a particular data repository unit 108 has been exhausted then resources dedicated to retrieval from that DRU 108 (such as, corresponding storage node 106, for example) can be released by the session manager 104, assuming the resources are no longer useful for the retrieval as a whole.

According to an embodiment of the present invention, at 206, prior to allocating the resources between the received data retrieval requests, the session manager 104 preferably determines a resource demand for each of the requests by utilizing timestamp based indexing techniques. These indices may be used by the session manager 104 to locate storage files in which data streams relevant to the processing of a particular data retrieval request can be found in. These indices also contain samplings of time stamps, which specify portions of the file (i.e., byte ranges) that correspond to particular time ranges. For example, as described in greater detail below and in co-pending application entitled "Timestamp-Based Indexing of Data Items in Real-Time Storage", the session manager 104 may access a timestamp based index associated with a given data stream and provided by the catalog 110 to retrieve locators that indicate the DRUs 108, specific files within the identified DRUs 108, and specific offsets within the identified files where data of the given data stream is stored, followed by performing one or more accesses to a particular DRU 108 in order to read the requested data.

Many other beneficial results can be attained by the session manager 104 utilizing timestamp based indexing techniques disclosed herein. For example, when a particular client application 102 makes a data retrieval request associated with a particular time range, that application 102 does not know how much data will be returned in response by the storage network 100. It is possible that the requesting application 102 would not be able to handle the size of the data it requested (e.g., if receiving buffers are not large enough and/or close to being full). At least in some cases, the application 102 that sent the original data retrieval request may prefer to receive smaller data streams if it had information about the size of the data that will be returned in response to the submitted request. In such scenario, the application 102 may replace the original request associated with a first time period with a plurality of other data retrieval requests, each of the plurality of data retrieval requests specifying a time period of shorter duration as compared to the first time period. Furthermore, one or more applications 102 may need to perform an analysis of available data, for example, for maintaining their own data-related statistics and/or characteristics. Advantageously, according to an embodiment of the present invention, at 206, the session manager 104 may provide, in response to receiving one or more data retrieval requests from that application 102, data retrieval analysis report that indicates approximately how many data items are likely to be returned and how large the payload would be responsive to the received requests.

Referring now to FIG. 3, there is shown a flowchart of operational steps performed by the session manager module of FIG. 1 to provide data retrieval analysis with respect to the received requests, in accordance with an illustrative embodiment of the present invention. Before discussing the steps in FIG. 3, it should be noted that the step 206 discussed above in conjunction with FIG. 2, further involves the session manager 104 sub-allocating the computational resources allocated to a particular data retrieval request to each data stream related to the data retrieval request. In an embodiment, the session manager 104 allocates the computational resources to the data stream based on the analysis described below. Similarly to data retrieval requests, the session manager 104 is not necessarily going to evenly split the computing resources among the relevant data streams. At least in some cases, the applications 102 may request data contained in different types of data streams, with respect to a transmission rate, such as, but not limited to, high rate (bytes/second) data streams and low rate data streams. Furthermore, in the time based storage system disclosed herein, it is highly unlikely that all relevant streams will contain data exactly matching the time range specified in the data retrieval request. For example, some relevant data streams may only contain data at the beginning of an expiry period (or start/end time range) associated with the data retrieval request, while other data streams may only contain data at the end of the expiry period. According to an embodiment of the present invention, the session manager 104 may delay the allocation of resources to a set of data streams containing data at the end of the expiry period that typically cannot be delivered yet to the requesting applications 102.

At 302, the session manager 104 identifies data streams associated with the received data retrieval requests. According to an embodiment of the present invention, to provide optimal use of resources, the session manager 104 utilizes the aforementioned timestamp based indexing. In one embodiment, the session manager 104 interrogates each storage node 106 (e.g., by sending a query specifying a time range associated with a data retrieval request) to find out what relevant data is available at each DRU 108. Each storage node 106 aggregates a list of files, offsets and byte ranges within those files matching a specified time range. Not all interrogated storage nodes 106 necessarily have data requested by the application 102. It should be noted that when storing data, the storage nodes 106 may distribute a stream of content across any number of the DRUs 108 they manage. Based on the information received from each storage node 106, the session manager 104 identifies data streams associated with the received data retrieval requests.

In an embodiment, to retrieve the data, the storage nodes 106 execute the data retrieval transactions on multiple DRUs 108 in parallel and the results are merged upon arrival by the session manager 104 requesting the data. Even though the storage system 100 includes means for indexing time-based data streams, such indexing is not exact. Because in a preferred embodiment the timestamps are precise to the order of nanoseconds, it is almost impossible to index data to the exact precision of the data items' timestamps. Thus, at least in some cases, the session manger 104 performs approximations over an applicable time interval.

According to an embodiment of the present invention, original data contained in various data streams can be divided into fragments referred to hereinafter as stream segments. A particular data stream may have a plurality of start and stop times associated therewith. At least some streams may stop well before the end of the expiry period associated with the data retrieval request and may restart again at some point in time substantially closer to the end of the expiry period. Stream segments represent chunks of data associated with relevant time ranges (start/stop times) for each data stream. Thus, a stream segment contains a contiguous range of bytes that can be read from a corresponding DRU 108. At 304, the session manager 104 decomposes the identified data streams into a plurality of stream segments. It should be noted that as part of a data retrieval transaction, the storage node 106 is able to isolate data retrieval requests for the desired portions of the data streams using data stream segments byte range addressing or other suitable techniques as desired.

At 306, the session manager 104 assigns data from the timestamp based indexes to appropriate time blocks. Each time block is a data structure that represents a non-overlapping block of time ranges. In addition, the session manager 104 determines which stream segments associated with the data retrieval request (within a time range specified by the data retrieval request) do overlap. As discussed below in conjunction with FIG. 4, each time block includes a corresponding time range in which one stream segment overlaps another stream segment. In other words, at 306, the session manager 104 generates a time block for each unique timestamp associated either with a start point of a data segment or an end point of a data segment. Time blocks themselves do not overlap, even though each time block can be associated with multiple stream segments.

Figure 4:
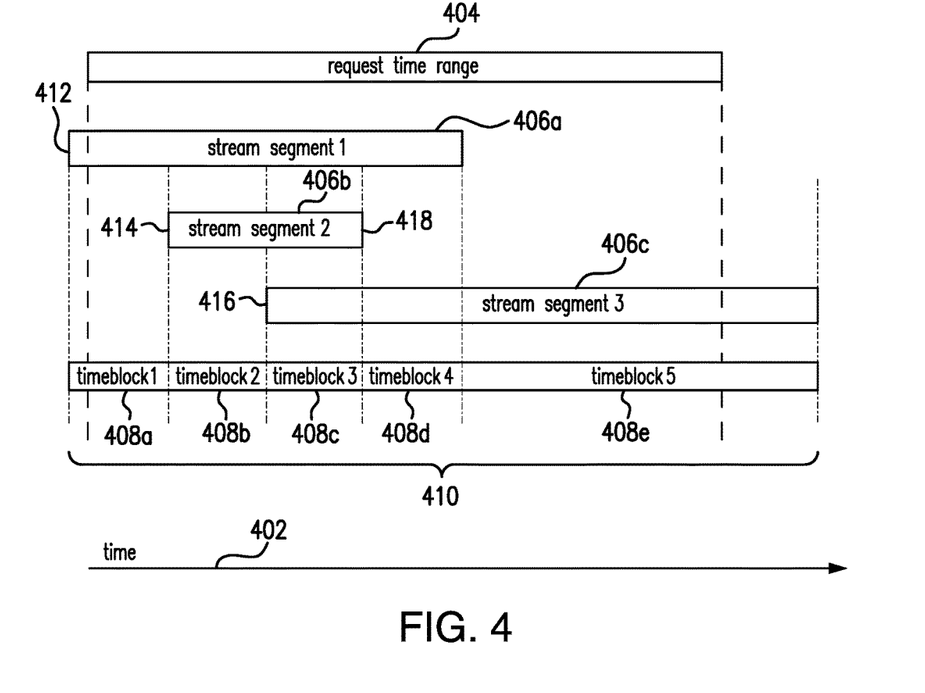
FIG. 4 is a block diagram illustrating how data from a plurality of time-based indexes is combined into non-overlapping blocks of time ranges, in accordance with an illustrative embodiment of the present invention.

Turning to FIG. 4 now, FIG. 4 is a block diagram illustrating how data from a plurality of time-based indexes is combined into non-overlapping blocks of time ranges, in accordance with an illustrative embodiment of the present invention. In this example, assume that at step 302, the session manager 104 identified three stream segments as associated with the received data retrieval request. In other words, at least a portion of a first data segment 406a, second data segment 406b and third data segment 406c is within a time range 404 specified by the data retrieval request received by the session manager 104. As shown in FIG. 4, relevant overlapping data based on the timestamp indexing mechanism disclosed herein may be associated with a time period 410 at least slightly exceeding the time range 404 specified by the data retrieval request at least in part due to the time granularity of the timestamp based indexes.

As noted above, during the specified time range 404 various data segments 406a-406c may start and stop at various points in time. Since data segments 406a-406c shown in FIG. 4 overlap, at step 306, the session manager generates five successive time blocks 408a-408e. The horizontal axis 402 represents time. The first time block 408a includes a time range from a timestamp 412 associated with a start point of the first data segment 406a to a timestamp 414 associated with a start point of the second data segment 406b. The second time block 408b includes a time range from the timestamp 414 associated with the start point of the second data segment 406b to a timestamp 416 associated with a start point of the third data segment 406c. The third time block 408c includes a time range from the timestamp 416 associated with the start point of the third data segment 406c to a timestamp 418 associated with a stop point of the second data segment 406b and so on. As illustrated in FIG. 4, time blocks 408a-408e do not overlap in time 402. However, each time block 408a-408e can be associated with multiple data stream segments 406a-406c. For instance, the second time block 408b is associated with portions of the first 406a and second 406b data segments, the third time block 408c is associated with portions of the first 406a, second 406b and third 406c data segments, while the fifth time block 408e is associated only with a portion of the third 406c data segment. Notably, each time block is associated with a constant number of data segments to retrieve from.

Referring back to FIG. 3, in one embodiment of the present invention, at 308, the session manager 104 utilizes time blocks to determine how much data to request from each relevant data stream. At 310, the session manager 104 estimates, for each data retrieval request, how many iterations of data retrieval and merge sorting are needed from each identified stream segment to provide one aggregated and sorted stream of data items.

Now referring back to FIG. 4, data can be retrieved sequentially in order from left to right. In other words, the session manager 104 estimates how much resources need to be allocated for the first time block 408a, second time block 408b, third time block 408c, etc. It should be noted that this estimate can be applied to any resource type, such as, but not limited to, memory, I/O threads, bandwidth, etc. When a particular time block is associated with only one data stream, such as the first time block 408a and the fifth time block 408e, the entire resource allocation can be given to that stream segment (i.e., first segment 406a and third segment 406c, respectively). It should be noted that, generally, the session manager 104 will have sufficient resources to allocate to a plurality of data stream segments associated with a plurality of data streams. In an embodiment of the present invention, the session manager 104 may continue allocating resources to a plurality of data retrieval requests in an iterative manner until all resources are exhausted/consumed.

Further, the session manager 104 processes one time block at a time and when one or more time blocks are associated with more than one data stream segment, the session manager 104 divides the resources among the corresponding data streams. However, again, it is not necessarily desirable for the session manager 104 to allocate resources evenly. According to an embodiment of the present invention, time based index records provide metadata which may include, among other information, byte ranges and time information associated with those byte ranges for segments within a stream. Accordingly, the session manager 104 is capable of calculating the average rate of each stream segment 406a-406c for each time block 408a-408e. In other words, the session manager 104 may adaptively adjust the allocation of resources to each stream segment based on a calculated data stream rate. Equivalently, the amount of resources allocated to each stream having slower rate can be reduced by the session manager 104. For example, if the second stream segment 406b is operating at half the rate of the other two segments 406a and 406c, then the session manager 104 may allocate 20% of the resources to the slower segment 406b, and 40% of the resources could be allocated to each of the other two segments 406a and 406c. By allocating half as much resources to the slower segment, the session manager 104 reduces or eliminates the possibility of requesting data that would not be delivered for a long time. In other words, the session manager 104 optimizes resource allocation based on all available information about data associated with a particular data retrieval request.

Once the session manager 104 estimates the size of data to request from the identified data streams for each of the received data retrieval request and allocates the shared resources among the received data request, at 312, the session manager 104 may report the estimation results back to the client applications 102. Such estimation results (e.g. data retrieval analysis report) may include, but are not limited to, the estimated total count of qualified data items and its associated estimated total data size. As described in greater detail below, the session manager 104 may stream the retrieved data items as a plurality of batches. In such an embodiment, steps 310 and 312 may apply to a batch of data rather than the entire set of data associated with the data retrieval requests. It should be noted that the data retrieval analysis report associated with batches subsequent to the first batch may include additional information such as, but not limited to, remaining data set, detected errors, corruption of data, data gaps, etc.

According to an embodiment of the present invention, the session manager 104 is enabled to, in addition to aggregating relevant stream segments of the stored data content in real time, sort the data content (data items) within and/or among the data streams, and can deliver those streams as a customized stream of data items relevant to client applications 102 according to their requirements, as determined by their data retrieval request data and/or their configuration parameters. Further, according to an embodiment, requirements of client applications 102 may indicate data item delivery options (sort control parameters), such as, but not limited to, unordered delivery, weakly ordered delivery and strongly ordered delivery. If client applications 102 request unordered delivery, the session manager 104 merely transports data items to the corresponding applications 102 in order in which they are stored on DRUs 108, one stream at a time. If client applications 102 request weakly ordered delivery option, the session manager 104 sorts data items between relevant data streams, but not within individual streams. In other words, if one or more data items are stored on DRUs 108 out of order, the session manager 104 delivers these data items out of order as well. In case one or more applications 102 requested strongly ordered delivery, the session manager 104 sorts data items between relevant data streams based on learned time correlations among identified data stream segments and sorts the ordering of data items within each relevant data stream.

Referring back to FIG. 2, at 208, the session manager 104 in cooperation with one or more storage nodes 106 retrieves the requested data from the one or more of DRUs 108. In one embodiment, each storage node 106 may generate a plurality of data retrieval transactions based on the criteria (i.e. time blocks) specified by the session manager 104 and may transport the stored data returned by one or more of DRUs 108 back to the session manager 104. As noted above, some embodiments can implement a hierarchical session management, thus some data aggregation can take place at various levels of hierarchy structure and the session manager 104 is responsible for aggregating results in a single sorted stream of data items. Accordingly, in order to prepare for data delivery, the session manager 104 preferably scans data received from the one or more storage nodes 106 for data items. Furthermore, stored data items are typically contained in the file system structure containing in a contiguous form, e.g., as a homogenous block (substream) on the DRU 108. The data items include encoded headers containing at least a length field indicating the length of the data item, a type field indicating the type of the data item, two or more timestamps representing a time interval associated with the time-ordered data item and a unique data item ID. The data item ID field allows the session manager 104 to obtain additional information about each data item, such as, but not limited to, the data stream to which a given data item belongs to, its QoSt-based attributes, and the like. The length field allows the session manager 104 to learn about how much data to deliver, with respect to each data item and how far to advance a cursor, described below, to reach the beginning of the subsequent data item. In one embodiment, the session manager 104 reads a certain predetermined amount of data returned from the one or more DRUs 108 by one or more storage nodes 106. Then, as soon as a portion or the entire data returned by the storage node(s) 106 is read-in, the session manager 104 can immediately start processing this data based on the corresponding data retrieval request information.

According to an embodiment of the present invention, processing performed by the session manager 104 may include merging and optionally sorting data items returned by the storage node(s) 106 (step 210). This processing enables the rearrangement (if necessary) of stored data from multiple segments into single segments containing consecutive data items prior to delivery to requesting applications 102. The session manager 104 starts the merge/sorting procedure by examining the metadata stored in each header associated with the first data item of each relevant data segment. Further, the session manager 104 performs this step for each relevant data stream. In other words, the session manager 104 starts the data item rearrangement process with determining the temporal positions of said first data items in each data stream. The determination of the temporal position is enabled as a function of extraction of timestamp data during first data item processing/scanning as well as inserting an extracted timestamp into an ordered delivery map, which represents a linear timeline, keyed by that timestamp as set forth herein. In one embodiment, the delivery map can be implemented as a B tree having a time tree index (i.e., timestamp). The temporal series of timestamps corresponding to various data items across all stream segments provides the item delivery order (within each batch of data items). If determined from the data presented by the storage node 106 that all data items stored on all DRUs 108 are sorted by time, then the session manager 104 does not need to perform any additional scanning before the first data item can be delivered to the requesting application 102. The first data item in the ordered delivery map naturally has the earliest temporal position. Thus, the session manager 104 may designate the first data item as the next data item to be delivered to the requesting client application 102 (at step 212).

However, if determined from the data presented by the storage node 106 that all data items within the streams are at most N seconds out of order, where N is an arbitrary number, then the session manager 104 performs additional scanning until it reaches a data item having a timestamp associated therewith that is more than N seconds greater than the timestamp associated with the earliest deliverable item. Again, the session manager 104 performs an ordered, sorted insertion of at least one data item entry into the sequential delivery map according to the data item's associated timestamp. As noted above, the first data item in the ordered delivery map naturally has the earliest temporal position. Thus, the session manager 104 may transmit/deliver the first data item to the requesting client application 102. In one embodiment, at step 212, the session manager 104 bundles the retrieved data items into a plurality of batches. The term "plurality of batches" used herein refers to a series of data item packages.

According to an embodiment of the present invention, after the session manager 104 completes delivery of the first batch of data items, it may return to merge-sorting step 210 and repeat the process of retrieving, merging and delivering data items in an iterative manner until all the data items in the data provided by the storage node(s) 106 have been processed, which could be determined by a failed read attempt, or until the client application 102 cancels the request. These iterations can occur at any layer of the hierarchical storage structure managed by the session manager 104. The session manager 104 may maintain a delivery map cache that indicates results of scanned data items, avoiding repeated scanning of the same data. The session manager 104 may update the delivery map cache for a particular data stream segment only when a data item is delivered from that stream segment. In one embodiment, in step 212, the session manager 104 may implement data structures that use shared pointers to pass data items to two or more client applications 102. For example, one data item meeting multiple data retrieval criteria may go to two or more different client applications 102.

Despite optimizing data retrieval process as set forth above, the session manager 104 can, in some cases, create bottlenecks and degrade overall performance on the client end if the client applications 102 have no means to control the data delivery rate and/or progress of the data retrieval requests they make. If a slow client application 102 has not yet processed the data already delivered by the session manager 104, then the session manager 104 should be capable of pausing or otherwise scaling back data delivery for this slow application, so that the more urgent data is more likely to be delivered as it is needed. To cure some of the potential problems set forth above, various embodiments of the present invention provide a mechanism that allows the session manager 104 to better control the adaptive streaming data delivery process.

Referring back to FIG. 2 yet again, in various embodiments, after the data is being streamed (delivered) to the client application 102 in step 212, it is possible that the data delivery could be subsequently paused and resumed, for example, via pause and resume requests issued by the client application 102. More specifically, after consuming some batches of retrieved data, client applications 102 may or may not request next available batch of data at each iteration. In one embodiment, such "reluctance" to consume additional data may be considered by the session manager 104 as a pause request. Accordingly, at step 214, the session manager 104 may determine at the end of each iteration whether a pause request has been received for the data retrieval request being currently processed. In response to detecting no such requests (decision block 214, "No" branch), the session manager 104 may repeat the merge-sorting step 210 and the data delivery step 212 until such pause request is received. If the session manager 104 receives a pause request (decision block 214, "Yes" branch), at 216, the session manager 104 preferably pauses processing of the corresponding data retrieval request. According to an embodiment of the present application, the session manger 104 provides an option to the pause requesting client application 102 to retain its already allocated portion of shared computing resources or releasing the allocated resources back to the shared pool.

At 218, the session manager 104 may receive data retrieval request state information from at least one paused data streams associated with the data retrieval request. This step may further involve saving the received request state information by the session manager 104. An embodiment of the session manager 104 provides a cursor object. A cursor is an indicator that indicates the last delivered data item position (e.g., timestamp and byte offset of the next data item). A cursor may be used by the session manager 104 to fetch data items sequentially from each data stream. Further, at 218 the session manager 104 may save the current cursor position. At 220, the session manger 104 may receive a resume request (request for a next batch of data) for any data retrieval request being currently paused. If so (decision block 220, "Yes" branch), at 222, the session manager 104 preferably resumes delivery of the sorted sequence of data items where the session manager 104 last left off for a corresponding data retrieval request. In other words, if a cursor is used by the session manager 104 to fetch data, the next data item is retrieved from the specified data stream for delivery starting at the cursor position.

In summary, various embodiments of the present invention describe a novel storage management and data retrieval approach that offers a cost-effective network storage solution capable of retrieving, processing and providing large amounts of time-based data without adding significant overhead. Advantageously, the disclosed data management platform employs an elaborate scheme of managing and dynamically allocating computing resources among multiple client applications. In another aspect, the disclosed data storage system is capable estimating the size of query results and providing such estimates to an application using the disclosed storage network in an efficient manner that is transparent to the application. Various embodiments of the present invention introduce a new approach aimed at parallel retrieval of data from multiple streams stored on multiple storage devices and aimed at providing customized merged and sorted data stream of aggregated data items to the client applications.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A stream based storage system in a high capacity network, the system comprising:
   a plurality of storage nodes adapted to provide storage and retrieval of time-based data of one or more data streams in response to a receipt of a time-based data retrieval request associated with the one or nor data streams, each of the one or more data streams comprising a plurality of time-ordered data items having a header comprising two or more timestamps representing a time interval associated with each of the plurality of time-ordered data items;
   a plurality of applications providing a user interface to issue the time-based data retrieval request associated with the one or more data streams; and
   one or more session managers communicatively coupled to the plurality of applications and to the plurality of storage nodes, the one or more session managers adapted to:
      dynamically allocate shared resources between at least some of the plurality of applications submitting simultaneous time-based data retrieval requests;
      retrieve data requested by the simultaneous time-based data retrieval requests from one or more of the plurality of storage nodes using timestamp based indexes associated with the one or more data streams in a substantially parallel manner;
      merge-sort the retrieved data by time using the timestamp based indexes associated with the one or more data streams;
      identify data streams associated with the time-based data retrieval requests;
      decompose each of the identified data streams into plurality of stream segments, wherein each of the stream segments represents a contiguous range of bytes that is read from one of the plurality of storage nodes and wherein each of the stream segments has a corresponding time index associated therewith;
      combine the time indexes into a plurality of non-overlapping time blocks, wherein the time block is a data structure describing each time range in which one stream segment overlaps another stream segment;
      estimate the size of data to request from each of the identified data streams based on an analysis of the non-oyerlapping time blocks; and
      transmit the sorted data to the plurality of applications based on a delivery rate controlled by each application associated with each time-based data retrieval request wherein each timestamp based index associates each of the plurality of stream segments with a plurality of time-ordered data items contained within each stream segment and further associates each of the plurality of stream segments with a particular storage file.

2. The stream based storage system as recited in claim 1, wherein the time-based data retrieval request specifies a time range and one or more stream identifiers.

3. The stream based storage system as recited in claim 1, wherein the one or more session managers are further adapted to classify the submitted simultaneous time-based data retrieval requests and adapted to allocate the shared resources based on the retrieval request classification.

4. The stream based storage system as recited in claim 1, wherein the one or more session managers and the plurality of storage nodes are communicatively coupled to a catalog, the catalog comprising distributed tables or columns of metadata that describes the one or more data streams stored by the stream based storage system, the metadata comprising at least the timestamp based indexes associated with all stored data streams.

5. The stream based storage system as recited in claim 1, wherein the shared resources are allocated based on the size of each of the plurality of stream segments and based on a user-configurable parameter indicating a maximum number of simultaneous data retrieval requests to be processed by the stream based storage system.

6. The stream based storage system as recited in claim 1, wherein the session managers are further adapted to analyze data matching the one or more time-based data retrieval requests and to provide results of the analysis to the one or more applications that submitted the one or more data retrieval requests, wherein the analysis results indicate at least an estimated number of stored time-ordered data items to be retrieved in response to the submitted one or more data retrieval requests.

7. the stream based storage system as recited in claim 1, wherein the session managers are adapted to retrieve data in an iterative manner.

8. The stream based storage system as recited in claim 1, wherein the time-based data retrieval request includes a sort control parameter indicating how to sort the retrieved data and wherein the session managers are adapted to merge-sort the retrieved data based on the sort control parameter.

9. The stream based storage system as recited in claim 1, wherein the shared resources comprise at least one of shared memory, bandwidth, storage capacity of a storage node.

10. The stream based storage system recited in claim 1, wherein the header further comprises a length field associated with each of the plurality of time-ordered data items.

11. The stream based storage system as recited in claim 1, wherein the session managers adapted to merge-sort the retrieved data are further adapted to determine temporal positions for each time-ordered data item contained within the retrieved data by inserting a timestamp associated with each time-ordered data item into a delivery map, the delivery map comprising a sequential timeline of timestamps corresponding to all inserted time-ordered data items.

12. The stream based storage system as recited in claim 7, wherein the session managers are adapted to pause data retrieval and/or data transmission associated with the one or more data streams based on a corresponding pause request received from one of the plurality of applications, wherein the session managers are adapted to save a cursor associated with the one or more paused data streams in response the received pause request, and wherein, responsive to receiving a resume request from one of the plurality of applications, the session managers are adapted to continue the data retrieval and/or data transmission based on the position indicated by the saved cursor.

13. A computer program product for storing and retrieving stream based data in a high-capacity network having a plurality of storage nodes, the computer program product comprising:

one or more computer-readable storage devices and a plurality of program instructions stored on at least one of the one or more computer-readable storage devices, the plurality of program instructions comprising:

program instructions to dynamically allocate shared resources between at least some of a plurality of applications submitting simultaneous time-based data retrieval requests;

program instructions to retrieve data of one or more data streams requested by the simultaneous time-based data retrieval requests from one or more of the plurality of storage nodes using timestamp based indexes associated with the one or more data streams in a substantially parallel manner;

program instructions to merge-sort the retrieved data by time using the timestamp based indexes associated with the one or more data streams;

program instructions to transmit the sorted data to the plurality of applications based on a delivery rate controlled by each application associated with each time-based data retrieval request;

program instructions to identify data streams associated with the time-based data retrieval requests;

program instructions to decompose each of the identified data streams into a plurality of stream segments, wherein each of the stream segments represents a contiguous range of bytes that is read from one of the plurality of storage nodes and wherein each of the stream segments has a corresponding time index associated therewith;

program instructions to combine the time indexes into a plurality of non-overlapping time blocks, wherein the time block is a data structure describing each time range in which one stream segment overlaps another stream segment; and program instructions to estimate the size of data to request from each of the identified data streams based on an analysis of the non-overlapping time blocks.

14. The computer program product of claim 13, wherein the time-based data retrieval request specifies a time range and one or more stream identifiers.

15. The computer program product of claim 13, further comprising program instructions to classify the submitted simultaneous time-based data retrieval requests and program instructions to allocate the shared resources based on the retrieval request classification.

16. The computer program product of claim 13, wherein the program instructions to dynamically allocate the shared resources further comprise program instructions to dynamically allocate the shared resources based on the size of each of the plurality of stream segments and based on a user-configurable parameter indicating a maximum number of simultaneous data retrieval requests to be processed.

17. The computer program product of claim 13, further comprising program instructions to analyze data matching the one or more time-based data retrieval requests and to provide results of the analysis to the one or more applications that submitted the one or more data retrieval requests, wherein the analysis results indicate at least an estimated number of stored time-ordered data items to be retrieved in response to the submitted one or more data retrieval requests.

* * * * *